United States Patent [19]

Wells et al.

[11] Patent Number: 4,898,703

[45] Date of Patent: Feb. 6, 1990

[54] UTILIZATION OF POLYESTER IN PLACE OF LEAD FOR USE AS A SHEATHING MATERIAL FOR CURING LONG LENGTH HOSE

[75] Inventors: Hoyt M. Wells, Akron, Ohio; William J. Determan, Pierce; Vernon V. Vanis, Norfolk, both of Nebr.; John E. Hrivnak, Clinton; Donald E. Richeson, North Canton, both of Ohio; Timothy P. Saupe, Madison, Wis.

[73] Assignee: The Goodyear Tire & Rubber Company, Akron, Ohio

[21] Appl. No.: 334,500

[22] Filed: Apr. 7, 1989

[51] Int. Cl.$^4$ .................. B29C 63/18; B29C 35/06
[52] U.S. Cl. ...................... 264/166; 264/37; 264/178 R; 264/236; 264/237; 264/317; 264/342 R; 264/347
[58] Field of Search .............. 264/166, 178 R, 165, 264/317, 37, 342 R, 236, 237, 347, 338; 425/113, 379.1, 445, 94, 96, 97

[56] References Cited

U.S. PATENT DOCUMENTS

| | | | |
|---|---|---|---|
| 2,444,903 | 7/1948 | Van Buren | 18/53 |
| 3,255,284 | 6/1966 | Meisiohn | 264/95 |
| 3,383,448 | 5/1968 | Bader et al. | 264/166 |
| 3,479,419 | 11/1969 | Hochhauser | 264/236 |
| 3,690,796 | 9/1972 | Borsvold | 264/166 |
| 4,019,939 | 4/1977 | Barbier et al. | 264/317 |
| 4,104,098 | 8/1978 | Hush et al. | 264/209.6 |
| 4,137,949 | 2/1979 | Linko III et al. | 138/125 |
| 4,174,365 | 11/1979 | Pahl | 264/146 |
| 4,451,306 | 5/1984 | Verne | 264/173 |
| 4,458,128 | 7/1984 | Chabinsky | 425/174 |
| 4,559,095 | 12/1985 | Babbin | 156/244.13 |
| 4,680,156 | 7/1987 | Collier | 264/209.6 |
| 4,702,867 | 10/1987 | Sejimo et al. | 264/25 |

FOREIGN PATENT DOCUMENTS

| | | | |
|---|---|---|---|
| 1965670 | 7/1971 | Fed. Rep. of Germany . | |
| 60-131714 | 7/1985 | Japan | 264/236 |
| 6354215 | 3/1988 | Japan . | |

*Primary Examiner*—Jeffery Thurlow
*Attorney, Agent, or Firm*—Marc R. Dion Sr.

[57] ABSTRACT

A method of vulcanizing a tubular article by extruding a sheath of unoriented polyethylene terephthalate about the article followed by quenching the sheath to an amorphous state. The sheathed article is then subjected to vulcanizing conditions in order to convert the sheath from the low density amorphous state to the higher density crystalline state, thus compressing the article to effect a smooth finish.

5 Claims, No Drawings

UTILIZATION OF POLYESTER IN PLACE OF LEAD FOR USE AS A SHEATHING MATERIAL FOR CURING LONG LENGTH HOSE

TECHNICAL FIELD

This invention relates to a process for vulcanizing tubular articles. More particularly, it relates to a sheathing process for curing hoses. Most particularly, the process utilizes an unoriented polyester in the place of lead as a sheathing material for curing hose.

BACKGROUND OF THE INVENTION

The use of lead as a sheathing material around a hose for the curing process has been known for at least sixty years. Inherent in the use of lead in industrial hose applications are high energy, labor, and equipment costs, as well as certain environmental and health concerns. It was therefore desired to provide a less expensive and safer means of producing sheath cured hose.

It has been known to use a fabric wrapper applied under tension about unvulcanized articles supported by drums, molds, cores or mandrels, wherein the wrapper fabric is composed of nylon warp thread applied circumferentially to the unvulcanized article. It was recognized that the nylon material had been found to contract by a much greater amount when heated than cotton material, thereby providing substantially greater circumferential contraction.

There was also known a process for making a hose wherein an internally supported hose is drawn through a reservoir of molten nylon and then through a cooling zone to shrink the nylon on the unvulcanized hose. This was followed by vulcanization and stripping of the nylon sheath. Also known is a process for producing hose by the temporary application of a plastic jacket, the preferred jacket being disclosed as a polyamide. It was stated that the plastic jacket was hard enough coming out of the die to exercise pressure on the hose. It further stated the advantages of lighter weight and thinner walls and being able to put more hose on a vulcanization drum. The criteria for selecting such a plastic was given as the tensile strength, the temperature resistance, and hydrolysis resistance.

Other art discloses making of a tubular article where, prior to curing, the tube is wrapped with a shrinkable plastic made of Mylar and then heating to shrink it. Mylar is a trademark for an oriented polyethylene terephthalate. Other art discloses extruding a certain amount of a reusable material of appropriate thermal behavior for vulcanization purposes, to provide vulcanization energy and the shrinkage of the jacketing supplies the pressure. Further, it states that the overcoating is a thermoplastic shrinking composition while no specific materials are mentioned. Another patent discloses a process for curing an elastomeric tubular article having a thermoplastic jacket. In addition to the preferred materials being described as thermoplastic elastomers, which includes segmented polyesters such as Hytrel, the patent also cites the use of polyphenylenesulfide, polymethylpentene and ultra-high molecular weight polyethylene. It also discloses that the jacket serves to protect, compact, as well as yield a smooth tubular article surface during vulcanization.

Still another patent discloses a method for continuously vulcanizing hoses, wherein a layer of heat resistant synthetic resin, which has a melting point higher than the vulcanizing temperature, is provided over the outer periphery of a rubber hose in a uniform thickness. After the resin layer is cooled and hardened, the rubber hose is heated and cured in a microwave vulcanizing tank before being subjected to vulcanization by heat conduction in an ordinary vulcanizing tank. After completion of vulcanization, the synthetic layer of resin is peeled off and removed. Examples of the resin are described as being non-polar resins, and specifically mentioned are polytetrafluoroethylene (Teflon) or polymethylpentene. One object of the present invention is to provide a sheathing material which, when applied to a tubular article, can be quickly quenched to an amorphous state in order to preclude the distortion of the green tubular article prior to the vulcanization step. another object of the present invention is to provide a sheathing material which, when heated during the vulcanization step, is transformed from a lower density amorphous state to a higher density crystalline state in order to shrink upon the tubular article. A still further object of the present invention is to provide a sheathing material which may be cooled down after the vulcanization step to a brittle material which may be easily removed from the tubular article.

DESCRIPTION OF THE INVENTION AND BEST MODE

In accordance with the practice of the present invention, there is disclosed a process for vulcanizing a tubular article comprising the sequential steps of:

(a) extruding about said article a sheath of unoriented polyethylene terephthalate;

(b) quenching such sheath at such a rate as to preclude crystallization;

(c) subjecting said sheath article to a vulcanization temperature sufficient to transform said sheath from an amorphous state to a crystalline state and to vulcanize said article; and (d) removing said sheath from said article.

The process of the present invention is carried out by constructing a tubular article and passing it through the die of a crosshead extruder where the unoriented polyethylene terephthalate is applied in a continuous operation at a temperature of about 275°–310° C. The sheath article is then quenched in cooling water at a quick enough rate to preclude crystallization of the sheathing material. This retention of the sheathing material in the amorphous state also precludes the distortion of the green tubular article.

Next, the cooled sheath article is wound on vulcanizing drums and placed in a vulcanizer such as an autoclave and subjected to heat and pressure. After a sufficient time to cure the tubular article, the heat and pressure are removed, and the sheath article is subjected to a water spray to cool the sheath article to below 100° C. to allow its handling. The cooled article sheath combination is then moved to a stripping area where the polyethylene terephthalate is removed by passing the composite through a series of variable position offset pins or rollers. After removal, the polyethylene terephthalate is ground for reuse or disposal.

The process of the present invention takes advantage of the increase in density of the polyethylene terephthalate as it changes from an amorphous to a crystalline state. In the sheathing operation, the polyethylene terephthalate is applied to the hose and quickly cooled in the amorphous state. Crystallization occurs during vulcanization at temperatures of 130+°C. The resulting increase in density causes the polyethylene terephthalate to shrink on the tubular article. Coupled with the thermal expansion of the mandrel on which the tubular article was built, the shrinkage allows for improved contact between the rubber and reinforcing materials, usually wire or textile.

In addition, the unoriented polyethylene terephthalate in the crystalline state is more brittle than in the amorphous state. The brittleness after cure causes it to break easily when bent to a sufficiently small bend radius by passing through a series of offset pins. This property facilitates easy removal of the sheath from the cured tubular article.

An effective sheath wall gauge was determined to be between 0.75 mm and 1.65 mm. At less than 0.75 mm, buckling of the polyethylene terephthalate occurs when the composite is bent during processing, and increased flexibility makes stripping more difficult. At gauges greater than 1.65 mm, the composite is too stiff to process, and slower cooling causes premature crystallization of the melt. In addition, because of the lighter weight of the polyethylene terephthalate vs. lead, and the thinner gauges used, more than twice the amount of hose can be put on a curing drum, therefore, effectively doubling the capacity of existing cure equipment.

While certain representative embodiments and details have been shown for the purpose of illustrating the invention, it will be apparent to those skilled in this art that various changes and modifications may be made therein without departing from the spirit or scope of the invention.

What is claimed:

1. A process for vulcanizing a tubular article comprising the sequential steps of:
    (a) extruding about said article a sheath of unoriented polyethylene terephthalate;
    (b) quenching such sheath at such a rate as to preclude crystallization;
    (c) subjecting said sheath article to a vulcanization temperature sufficient to transform said sheath from an amorphous state to a crystalline state and to vulcanize said article; and
    (d) removing said sheath from said article.

2. The process according to claim 1 wherein the extrusion step is carried out at 275°–275° C.

3. The process according to claim 1 wherein the vulcanization is carried out at greater than 130° C.

4. The process according to claim 1 further comprising cooling the cured sheath article to below 100° C. prior to removing the sheath from the article.

5. The process according to claim 1 wherein the sheath is removed by passing the sheath article through a series of offset pins or rollers.

* * * * *

UNITED STATES PATENT AND TRADEMARK OFFICE
CERTIFICATE OF CORRECTION

PATENT NO. : 4,898,703
DATED : February 6, 1990
INVENTOR(S) : Wells et al.

It is certified that error appears in the above-identified patent and that said Letters Patent is hereby corrected as shown below:

Column 4, claim 2, line 18, temperature range should read -- 275°-310°C --.

Signed and Sealed this

Twenty-first Day of April, 1992

Attest:

HARRY F. MANBECK, JR.

*Attesting Officer*   *Commissioner of Patents and Trademarks*